(12) United States Patent
Nandedkar et al.

(10) Patent No.: US 8,874,345 B2
(45) Date of Patent: Oct. 28, 2014

(54) METHOD AND SYSTEM FOR IDENTIFYING AN ERRONEOUS SPEED OF A VEHICLE

(75) Inventors: Vishram Vinayak Nandedkar, Karnataka (IN); Ajith Kuttannair Kumar, Erie, PA (US); Patricia Sue Lacy, Erie, PA (US); Pavan Vempaty, Auburn Hill, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/439,682

(22) Filed: Apr. 4, 2012

(65) Prior Publication Data

US 2013/0268172 A1    Oct. 10, 2013

(51) Int. Cl.
| | |
|---|---|
| *G06F 17/00* | (2006.01) |
| *G06F 19/00* | (2011.01) |
| *E01B 7/26* | (2006.01) |
| *B61K 3/00* | (2006.01) |
| *G01P 3/50* | (2006.01) |
| *G01P 21/02* | (2006.01) |
| *B61L 25/02* | (2006.01) |
| *B61L 3/08* | (2006.01) |

(52) U.S. Cl.
CPC . *G06F 17/00* (2013.01); *B61K 3/00* (2013.01); *B61L 25/021* (2013.01); *G01P 3/50* (2013.01); *G01P 21/02* (2013.01); *B61L 3/08* (2013.01)
USPC ............... 701/70; 701/19; 701/20; 701/123; 701/411; 701/416; 246/428; 184/3.1; 184/3.2

(58) Field of Classification Search
CPC ......... B61L 25/021; B61L 3/008; B61K 3/00; G06F 17/00
USPC ........ 701/19, 20, 70, 416, 123, 411; 246/428; 184/3.1, 3.2
See application file for complete search history.

(56) References Cited

U.S. PATENT DOCUMENTS

| 2,232,752 | A | * | 2/1941 | Wilson | ............................ 291/15 |
| 3,715,572 | A | * | 2/1973 | Bennett | ........................ 701/300 |

(Continued)

FOREIGN PATENT DOCUMENTS

| EP | 1396702 A1 | 3/2004 |
| JP | 11227607 A * | 8/1999 |

OTHER PUBLICATIONS

Kaihua Wo, "Online Measuring Method and System for Diameter Parameters of Wheel Set", Tech. and Innovation Conf., Nov. 6-7, 2006.

(Continued)

*Primary Examiner* — Calvin Cheung
*Assistant Examiner* — Angelina Shudy
(74) *Attorney, Agent, or Firm* — GE Global Patent Operation; John A. Kramer

(57) ABSTRACT

A method includes receiving an input size of a wheel of a vehicle, determining a derived speed of the vehicle that is based on the input size of the wheel, determining a reference speed of the vehicle as the vehicle moves, comparing the derived speed with the reference speed of the vehicle, and identifying an error in the input size of the wheel based on a difference between the derived speed and the reference speed. A system includes a control unit configured to determine a derived speed of a vehicle that is based on an input size of the wheel and a reference speed of the vehicle as the vehicle moves. The control unit compares the derived speed with the reference speed of the vehicle in order to identify an error in the input size of the wheel.

20 Claims, 4 Drawing Sheets

(56) References Cited

U.S. PATENT DOCUMENTS

| | | | | |
|---|---|---|---|---|
| 4,279,395 | A | * | 7/1981 | Boggio et al. ............ 246/182 R |
| 5,132,906 | A | * | 7/1992 | Sol et al. .......................... 701/80 |
| 5,615,119 | A | * | 3/1997 | Vos .................................... 701/4 |
| 5,691,900 | A | * | 11/1997 | Luckevich ...................... 701/41 |
| 5,748,474 | A | * | 5/1998 | Masuda et al. ................. 701/90 |
| 6,104,148 | A | * | 8/2000 | Kumar et al. ................... 318/52 |
| 6,148,269 | A | * | 11/2000 | Kumar et al. ................... 702/96 |
| 6,194,850 | B1 | * | 2/2001 | Kumar et al. ................... 318/52 |
| 6,230,100 | B1 | * | 5/2001 | Geier ............................. 701/466 |
| 6,313,742 | B1 | * | 11/2001 | Larson .......................... 340/442 |
| 6,324,461 | B1 | * | 11/2001 | Yamaguchi et al. ............ 701/80 |
| 6,417,668 | B1 | * | 7/2002 | Howard et al. ............... 324/426 |
| 6,585,085 | B1 | * | 7/2003 | Kumar ........................... 184/3.2 |
| 6,629,709 | B1 | * | 10/2003 | Tunley et al. .................... 291/2 |
| 6,631,321 | B1 | * | 10/2003 | Ciprian ......................... 701/469 |
| 6,893,058 | B2 | * | 5/2005 | Kumar et al. .................... 291/2 |
| 7,277,809 | B1 | | 10/2007 | DeWitt, Jr. et al. |
| 7,283,897 | B2 | | 10/2007 | Kane |
| 7,548,032 | B2 | | 6/2009 | Alton, Jr. |
| 7,593,795 | B2 | * | 9/2009 | Kane et al. ...................... 701/19 |
| 2004/0036590 | A1 | * | 2/2004 | Elsner et al. .................. 340/445 |
| 2004/0060375 | A1 | * | 4/2004 | Kumar et al. ................. 73/865.9 |
| 2005/0024001 | A1 | * | 2/2005 | Donnelly et al. ............... 318/66 |
| 2005/0065664 | A1 | * | 3/2005 | Tsuruhara et al. ................ 701/1 |
| 2005/0065701 | A1 | * | 3/2005 | Kumar et al. ................... 701/82 |
| 2005/0065726 | A1 | * | 3/2005 | Meyer et al. .................. 701/213 |
| 2005/0140144 | A1 | * | 6/2005 | Kumar ............................... 291/2 |
| 2005/0159873 | A1 | * | 7/2005 | Rudd, III ....................... 701/70 |
| 2005/0206230 | A1 | * | 9/2005 | Donnelly ....................... 303/139 |
| 2006/0265112 | A1 | * | 11/2006 | Hoeffel et al. .................. 701/29 |
| 2007/0001629 | A1 | * | 1/2007 | McGarry et al. ............... 318/52 |
| 2009/0088975 | A1 | * | 4/2009 | Sato et al. ..................... 701/214 |
| 2009/0186535 | A1 | * | 7/2009 | Sullivan ............................ 440/6 |
| 2009/0205401 | A1 | | 8/2009 | Munko et al. |
| 2009/0326733 | A1 | | 12/2009 | Abele et al. |
| 2010/0010770 | A1 | * | 1/2010 | Helck ........................... 702/141 |
| 2010/0023190 | A1 | * | 1/2010 | Kumar et al. ................... 701/20 |
| 2011/0184644 | A1 | * | 7/2011 | McBurney et al. ........... 701/208 |
| 2011/0257882 | A1 | * | 10/2011 | McBurney et al. ........... 701/208 |
| 2012/0158223 | A1 | * | 6/2012 | Liberatore et al. ............. 701/19 |
| 2014/0074328 | A1 | * | 3/2014 | Schaffler ......................... 701/20 |

OTHER PUBLICATIONS

Search Report and Written Opinion from corresponding PCT Application No. PCT/US2013/030647 dated Oct. 21, 2013.

* cited by examiner

METHOD AND SYSTEM FOR IDENTIFYING AN ERRONEOUS SPEED OF A VEHICLE

BACKGROUND

Some known vehicles measure speeds at which the vehicles travel (e.g., vehicle speeds) based on diameters of one or more wheels and the rates at which the wheels rotate. For example, in some locomotives, a diameter of a wheel associated with a designated axle (e.g., the second axle of a six axle locomotive) may be manually measured by an operator of the locomotive. The speed of the locomotive is then monitored and displayed to the operator by multiplying the diameter of the wheel by the speed at which the wheel rotates.

The diameter of the wheel may be incorrect. For example, the manual measurement of the diameter may result in an incorrect measurement due to human error, the measured diameter may be incorrectly entered into a control system of the vehicle (that calculates the vehicle speed), and/or software updates to the control system may result in previously entered diameters being erased or otherwise lost.

Incorrect wheel diameters can result in erroneous reporting of the vehicle speed to the operator. For example, with respect to an actual wheel diameter of 42 inches, a one inch error in the measurement of the diameter can result in an error of 2.38% in the reporting of the vehicle speed at an actual vehicle speed of 70 miles per hour (or 112.5 kilometers per hour). Such an error can cause the vehicle speed that is reported to the operator to be off by approximately 1.66 miles per hour (or 2.67 kilometers per hour). A three inch error in the measurement of the diameter can result in an error of 7.14% in the reporting of the vehicle speed at an actual vehicle speed of 70 miles per hour (or 112.5 kilometers per hour). Such an error can cause the vehicle speed that is reported to the operator to be off by approximately five miles per hour (or eight kilometers per hour).

The reporting of incorrect vehicle speeds can pose a safety threat, such as where the reported vehicle speed is slower than the actual speed of the vehicle. As a result, a need exists to identify erroneous vehicle speeds.

BRIEF DESCRIPTION

In one embodiment, a method (e.g., a method for identifying an error in a speed of a vehicle) is provided. The method includes receiving an input size of a wheel of a vehicle, determining a derived speed of the vehicle that is based on the input size of the wheel, determining a reference speed of the vehicle as the vehicle moves, comparing the derived speed with the reference speed of the vehicle, and identifying an error in the input size of the wheel based on a difference between the derived speed and the reference speed.

In another embodiment, a system (e.g., for identifying an error in a speed of a vehicle) includes an input device and a control unit. The input device is configured to be disposed onboard a vehicle for receiving an input size of a wheel of the vehicle. The control unit is configured to be disposed onboard the vehicle for determining a derived speed of the vehicle that is based on the input size of the wheel and a reference speed of the vehicle as the vehicle moves. The control unit also configured to compare the derived speed with the reference speed of the vehicle in order to identify an error in the input size of the wheel. The error is based on a difference between the derived speed and the reference speed.

In another embodiment, a method (e.g., for correcting a speed of a vehicle) is provided. The method includes determining a first speed of a vehicle that is based on an input size of a wheel of the vehicle. One or more controls of the vehicle are based on the input size of the wheel. The method also includes determining a second speed of the vehicle that is not based on the input size of the wheel of the vehicle, identifying a difference between the first speed and the second speed, deriving an error in the input size of the wheel based on the difference, and modifying the input size of the wheel based on the error.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
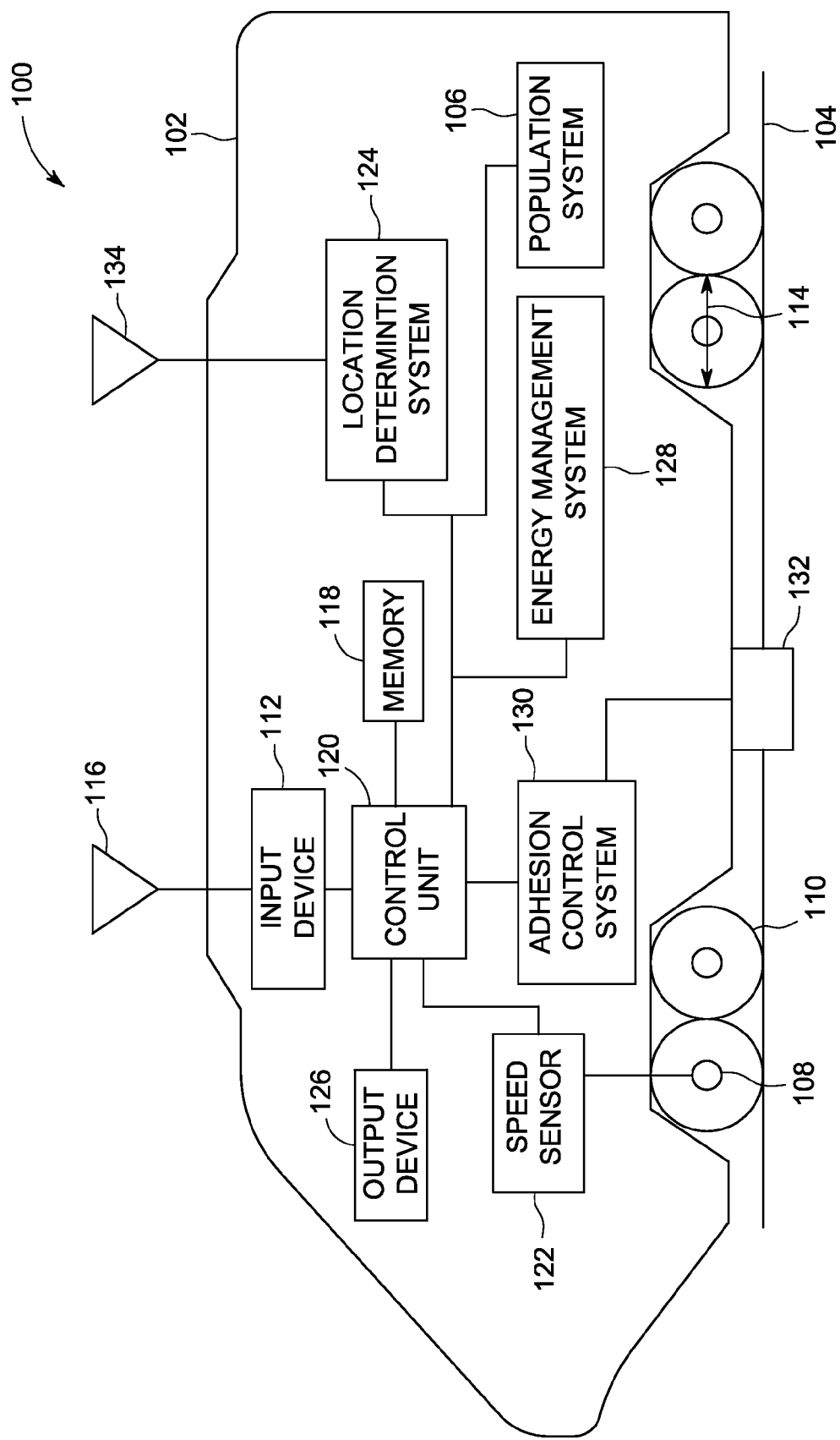
FIG. 1 is a schematic view of one embodiment of a vehicle system.

One or more embodiments of the inventive subject matter described herein provide systems and methods that correct vehicle speeds that are incorrect or inaccurate based on an underlying measurement. For example, some vehicles may derive the speeds at which the vehicles move by obtaining (e.g., measuring) a size of one or more wheels of the vehicle, such as a diameter of a wheel, and monitoring rotational speeds at which the wheel rotates in order to calculate the speed at which the vehicles move along a surface. As used herein, "rotational speed" refers to the speed at which a motor, engine, or other power-producing device rotates a wheel, axle, shaft, or other component (e.g., which may be expressed in number of rotations or angle of displacement per unit of time). "Speed" (e.g., other than rotational speed) refers to the speed at which a vehicle is propelled along a surface.

If the underlying measurement (e.g., the measurement of the wheel diameter) is incorrect, then the derived speed of the vehicle may be inaccurate, such as by not representing the actual speed at which the vehicle is moving relative to the surface on which the vehicle is traveling. In order to determine if the derived speed is inaccurate, a separate measurement of the vehicle may be made that is used to calculate the vehicle speed (referred to herein as a reference speed). As described below, this separate measurement is independent of the calculation of the vehicle speed that is based on the size of the wheel. For example, the separate measurement may involve identifying locations of the vehicle at different times (such as by using a location determination system) and calculating a distance between the locations and the time period between when the locations are identified. Alternatively, the speed of the vehicle may be directly measured (e.g., using a sensor such as a radar, laser, or other sensor).

The two (or more) determinations of the vehicle speed may be compared to determine if the measurements upon which one or more of the derivations of vehicle speed are based are incorrect or inaccurate. If the speed of the vehicle that is derived from a measurement of a size of a wheel is faster or slower than the determination of the speed of the vehicle that is derived from locations of the vehicle, then the measurement of the size of the wheel of the vehicle may be incorrect or inaccurate. For example, if the actual wheel size is larger than the measured wheel size, then the vehicle speed that is based on the measured wheel size may be slower than the actual speed of the vehicle (that is measured by or is closer to the vehicle speed measured from a location determination system). Alternatively, if the actual wheel size is smaller than the measured wheel size, then the vehicle speed that is based on the wheel size may be faster than the actual speed of the vehicle. An operator of the vehicle may be notified of the identified difference between the vehicle speed that is derived from a measurement of the wheel size and the actual vehicle speed or a vehicle speed that is measured using another technique. In one embodiment, the vehicle speed that is displayed to the operator and/or that is used to autonomously control operations of the vehicle may be modified based on the difference between the vehicle speeds.

FIG. 1 is a schematic view of one embodiment of a vehicle system 100. The system 100 includes a vehicle 102 that travels along a surface 104. In the illustrated embodiment, the vehicle is a powered rail vehicle, such as a locomotive. Alternatively, the vehicle 102 may represent another rail vehicle, such as a consist of locomotives, a train comprising one or more locomotives and one or more non-powered (e.g., incapable of self-propulsion) rail cars, and the like. In another embodiment, the vehicle 102 may represent another type of powered vehicle that is capable of self propulsion, such as an automobile, an off-highway vehicle other than a rail vehicle, a marine vessel, an airplane, and the like. The surface 104 may represent a track, a road, a body of water, air (e.g., over which an airplane flies), and the like, over which the vehicle 102 travels.

The vehicle 102 includes a propulsion system 106 that provides propulsive power to propel the vehicle 102 along the surface 104. In the illustrated embodiment, the propulsion system 106 may include or represent one or more engines and/or motors that generate tractive effort by rotating axles 108 joined to wheels 110 of the vehicle 102. Alternatively, the propulsion system 106 may include engines and/or motors that rotate turbines or other devices that propel the vehicle 102.

While the components of the system 100 are shown and described as being located onboard the vehicle 102, in another embodiment, one or more of the components may be disposed remote (e.g., off-board of the vehicle 102, such as at a dispatch facility).

An input device 112 is disposed onboard the vehicle 102 to receive input data related to the vehicle 102. The input device 112 can include a keyboard, microphone, stylus, touch screen, and the like, to receive the input data. Alternatively or additionally, the input device 112 may receive the input data from antenna circuitry 116, such as a transceiver and associated circuitry. For example, the operator or a remote location (e.g., outside the rail vehicle 102) may wirelessly transmit the input data to the input device 112 via the antenna circuitry 116.

The input data can include a size of one or more wheels 110 of the vehicle 102. For example, a human operator can manually measure a diameter 114 of a reference wheel 110 (e.g., a designated or preselected wheel) of the vehicle 102 and input the diameter 114 (or another value representative of the size of the wheel, such as a circumference, radius, radians, and the like, of the wheel 110) into the input device 112. The size of the wheel 110 that is received by the input device 112 may be referred to as an input size of a reference wheel of the vehicle 102. In another embodiment, the input size of the reference wheel is obtained from a computer readable storage medium, or a memory 118, of the vehicle 102. For example, instead of manually measuring the size of the wheel 110 and inputting the size into the input device 112, a default or designated (e.g., predetermined) size of the wheel 110 may be used or input into the input device 112.

A speed sensor 122 is disposed onboard the vehicle 102 to monitor the rotational speed of one or more of the wheels 110. For example, the speed sensor 122 may be included in or coupled to a traction motor (e.g., as represented by or included in the propulsion system 106) that rotates the axle 108 to which the wheel 110 is connected. The speed sensor 122 can monitor the rotational speed at which the traction motor rotates the axle 108 and/or wheel 110. In one embodiment, the speed sensor 122 measures the rotational speed at which the reference wheel 110 (e.g., the wheel 110 that was used to measure the input size) rotates. Alternatively, the speed sensor 122 can measure the rotational speed of another wheel 110 (e.g., not the reference wheel 110). The speed sensor 122 can include a magnetic sensor that monitors how rapidly a magnetic body on a rotating surface (e.g., the axle 108, wheel 110, or a gear or other shaft connected to the traction motor and/or axle 108) rotates, a light sensor that monitors how rapidly an optical target on the rotating surface rotates, how rapidly an electronic characteristic of a circuit between the sensor 122 and the rotating surface changes (e.g., a voltage or impedance change), and the like. Alternatively, one or more other types of speed sensors 122 may be used.

A control unit 120 onboard the vehicle 102 can use the input size of the wheel 110 and the rotation speed associated with the wheel 110 to calculate a speed of the vehicle 102 as the vehicle 102 moves along the surface 104. The control unit 120 may be embodied in a computer, computer processor, microcontroller, microprocessor, or other logic-based device, that operates based on one or more sets of instructions (e.g., software) stored on a tangible and non-transitory computer readable storage medium (e.g., hard drive, flash drive, ROM, or RAM).

If the input size of the wheel 110 includes or is expressed as a diameter of the wheel 110, then the control unit 120 can calculate a circumference of the wheel 110 according to or based on the following relationship:

$$C = \pi \times d \qquad \text{(Eqn. \#1)}$$

where C represents the circumference of the wheel 110 and d represents the diameter of the wheel 110 that is provided as the input size. In another embodiment, the input size may be expressed as a radius, a circumference, or other measurement of the wheel 110.

The control unit 120 can determine a derived speed of the vehicle 102 based on the circumference (C) and the rotation speed. For example, the control unit 120 can calculate a derived speed according to or based on the following relationship:

$$V_d = \frac{C \times \omega}{\alpha} \qquad \text{(Eqn. \#2)}$$

where $V_d$ represents the derived speed of the vehicle 102, C represents the circumference of the wheel 110, ω represents the rotational speed of the wheel 110 (e.g., as measured by the speed sensor 122), and α represents a calibration or correction factor. The calibration or correction factor may be used to account for gear ratios or other factors that may impact the derived speed.

The control unit 120 can store the input size of the wheel 110, the derived speed of the vehicle 102, rotational speed measured by the speed sensor 122, and/or other data in the memory 118. This information may be stored in the memory 118 for later retrieval and/or for logging or archiving the information for subsequent analysis.

The derived speed may be the speed that is reported to the operator of the vehicle 102 on an output device 126 onboard the vehicle 102. The output device 126 can include a monitor, touch screen (which may be the same or different than the input device 112), speaker, haptic device (e.g., that vibrates or changes temperature), and the like. The output device 126 can present the derived speed and a calculated speed error or speed difference due to the erroneous input size of the wheel (as described below) to the operator so that the operator can control operations of the vehicle 102 based on the derived speed. For example, the operator can decrease tractive output from the propulsion system 106 in order to decrease the speed of the vehicle 102 if the erroneous input size of the wheel 110 and/or the speed difference indicates that the derived speed is slower than the reference speed. Alternatively, the operator can increase tractive output from the propulsion system 106 in order to increase the speed of the vehicle 102 if the erroneous input size of the wheel 110 and/or the speed difference indicates that the derived speed is faster than the reference speed. The operator may re-measure the input size of the wheel 110 based on the erroneous input size and/or the speed difference when the vehicle 102 has stopped in order to correct subsequently calculated derived speeds of the vehicle 102.

A location determination system 124 can be disposed onboard the vehicle 102 to determine geographic locations of the vehicle 102 as the vehicle 102 moves along the surface 104. The location determination system 124 can include or be communicatively coupled with antenna circuitry 134 (which may be different from or the same as the antenna circuitry 116) to receive location data from a remote location. For example, the location determination system 124 may include a receiver and associated circuitry of a global positioning system (GPS) to determine locations of the vehicle 102, circuitry for locating the vehicle 102 relative to cellular transmission towers, and/or other circuitry, such as circuitry that receives wireless signals from a remote location that provide the location of the vehicle 102. The location determination system 124 may periodically determine a location of the vehicle 102 along a route of the surface 104 and/or may be prompted to determine locations of the vehicle 102 by the control unit 120. The location that is determined by the location determination system 124 may be referred to as a sensed location. In one embodiment, the location determination system 124 and/or control unit 120 may associate times with the locations of the vehicle 102. For example, the location determination system 124 and/or control unit 120 may time stamp the locations of the vehicle 102 that are acquired or determined by the location determination system 124. The locations of the vehicle 102 and/or the associated times at which the locations are determined can be stored in the memory 118.

The control unit 120 can use the locations of the vehicle 102 and times at which the locations are determined in order to calculate a reference speed of the vehicle 102. The reference speed can be calculated or determined in order to determine if the derived speed (that is based on the input size of the wheel 110) matches the reference speed, or if these speeds differ from each other. Alternatively, the location determination system 124 may determine the reference speed of the vehicle 102 and output a signal representative of the reference speed to the control unit 120.

Figure 2:
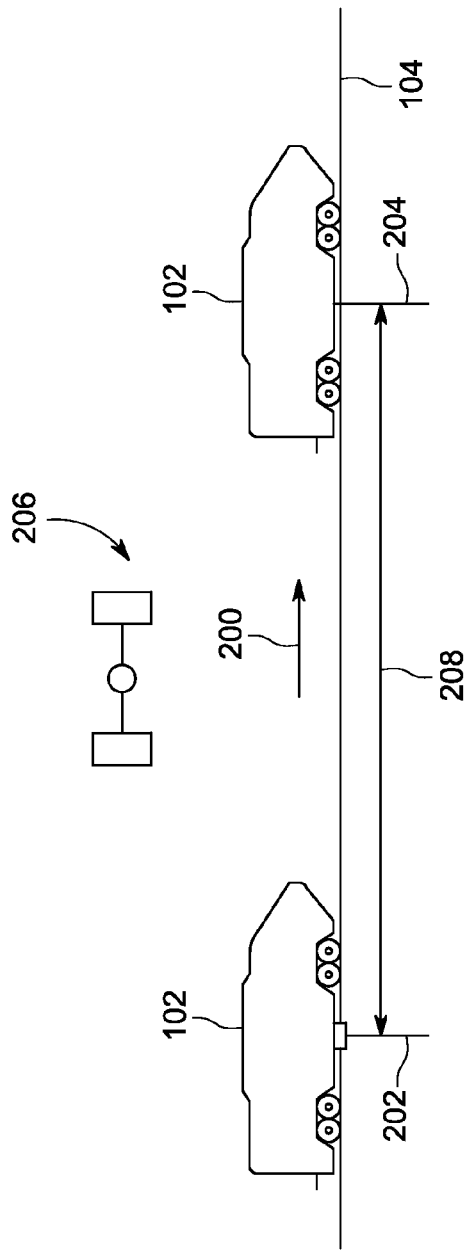
FIG. 2 is a schematic diagram of a vehicle shown in FIG. 1 moving along a surface in accordance with one example.

With continued reference to the system 100 shown in FIG. 1, FIG. 2 is a schematic diagram of the vehicle 102 moving along the surface 104 in accordance with one example. As the vehicle 102 moves in a traveling direction 200 along the surface 104, the location determination system 124 may determine a first location 202 of the vehicle 102 at a first time ($t_1$) and a different, second location 204 of the vehicle 102 at a subsequent, second time ($t_2$). As described above, the location determination system 124 may determine the locations 202, 204 based on communication with a GPS satellite system 206.

The control unit 120 may determine a distance measurement 208 that represents a distance between the locations 202, 204. The distance measurement 208 may be measured along a path or route between the locations 202, 204. For example, if the vehicle 102 is following a curved path (e.g., a curved route or track) and/or a path that extends over one or more crests and/or valleys, the distance measurement 208 may represent the distance along the curving, rising, and/or lowering surface 104 instead of a straight-line path from the first location 202 to the second location 204.

The control unit 120 also can determine a time difference between the times ($t_1$, $t_2$) associated with the locations 202, 204. Based on the distance measurement 208 and the time difference, the control unit 120 can calculate the reference speed of the vehicle 102. For example, the control unit 120 can calculate the reference speed of the vehicle 102 according to the following relationship:

$$V_r = \frac{D}{|t_1 - t_2|} \qquad \text{(Eqn. \#3)}$$

where $V_r$ represents the reference speed of the vehicle 102, D represents the distance measurement 208, $t_1$ represents the time associated with one of the locations 202, 204 used to determine the distance measurement 208, and $t_2$ represents the time associated with another one of the locations 202, 204 used to determine the distance measurement 208.

In another embodiment, the control unit 120 may acquire the reference speed of the vehicle 102 using another technique. For example, the control unit 120 may receive the reference speed from a radar sensor, a light sensor, or other sensor that provides information on how fast the vehicle 102 is traveling and that is not based on the same data as the derived speed. For example, the reference speed may be independent of the derived speed because the derived speed is based on the input size of the wheel 110 and the rotational speed of the axle 108 and/or wheel 110, while the reference speed is not based (e.g., not calculated from) the input size of the wheel 110 and/or rotational speed of the axle 108 and/or wheel 110.

The control unit 120 can limit when the reference speed is determined by acquiring or identifying the reference speed only when one or more operational conditions of the vehicle 102 are met, in one embodiment. For example, the control unit 120 may only identify the reference speed when a measurement error of the location determination system 124 is below a designated threshold. In one embodiment, the control unit 120 identifies the reference speed when a dilution of precision (DOP) of a GPS system (that is part of the location determination system 124) is no greater than a threshold, such as four. Alternatively, another value may be used.

As another example, the control unit 120 may only identify the reference speed when the vehicle 102 is in a non-powered state. In another embodiment, the control unit 120 may only identify the reference speed when the vehicle 102 is moving at a derived speed that falls within a designated range of speeds. For example, the control unit 120 may identify the reference speed when the vehicle 102 has a derived speed of between twelve and fifty miles per hour (or nineteen to eighty kilometers per hour). Alternatively, another speed range may be used. The control unit 120 may limit when the reference speed is identified in order to reduce error in the measurements of the locations used to calculate the reference speed.

Returning to the discussion of the system 100 shown in FIG. 1, the control unit 120 can compare the derived speed with the reference speed to determine if there is an error in the input size of the wheel 110. The control unit 120 can determine if the derived speed is faster or slower than the reference speed by at least one or more designated non-zero thresholds. If the derived speed differs from the reference speed by at least the threshold, then the control unit 120 may identify an erroneous input size of the wheel 110. For example, if the operator incorrectly measures the diameter of the wheel 110 as being larger than the actual diameter of the wheel 110 (or the default input size of the wheel 110 is larger than the actual diameter), then the derived speed may be faster than the reference speed (and/or actual speed) of the vehicle 102. Alternatively, if the operator incorrectly measures the diameter of the wheel 110 as being smaller than the actual diameter of the wheel 110 (or the default input size of the wheel 110 is smaller than the actual diameter), then the derived speed may be slower than the reference speed (and/or actual speed) of the vehicle 102.

The identified error in the input size of the wheel 110 may be reported to the operator of the vehicle 102 on the output device 126. For example, the identified error may be annunciated to the operator using one or more alarms, lights, sounds, displays, and the like. The output device 126 can present or indicate to the operator that the input size of the wheel 110 is incorrect. In one embodiment, the control unit 120 may determine a speed difference (e.g., absolute value difference, percentage difference, or the like) between the reference speed and the derived speed and report this speed difference to the operator via the output device 126. The operator may then use the reported error in the input size of the wheel 110 and/or the speed difference in conjunction with controlling further operations of the vehicle 102. For example, if the input size of the wheel 110 and the speed difference indicate that the derived speed is lower than the referenced speed, the operator can increase propulsion to the vehicle. If the input size of the wheel 110 and the speed difference indicated that the derived speed is higher than the referenced speed, the operator can decrease propulsion to the vehicle.

In one embodiment, the control unit 120 may determine a correction to the input size of the wheel 110 and/or to the derived speed based on the speed difference. For example, the control unit 120 can automatically calibrate the input size of the wheel 110 and/or subsequently calculated derived speeds when the erroneous input size of the wheel 110 and/or the speed difference is identified. The control unit 120 can convert the speed difference into an input size correction, such as by dividing the speed difference by the rotational speed of the axle 108 and/or wheel 110. Such an input size correction can represent a corrected circumference of the reference wheel 110. Alternatively or additionally, the control unit 120 can calculate the input size correction as a correction to the measured or default diameter of the wheel 110, such as by dividing the corrected circumference by the value of $\pi$. The control unit 120 may then use the corrected circumference or the corrected diameter to determine subsequent derived speeds of the vehicle 102 that are presented to the operator and/or used to control movement of the vehicle 102.

In another embodiment, the control unit 120 may determine the speed difference or speed error without identifying locations of the vehicle 102 and/or without use of a Kalman filter. For example, instead of determining locations of the vehicle 102 based on the input wheel size and/or the locations determined by the location determination system and then using these locations to identify speeds and/or wheel sizes, the control unit 120 may alternatively receive the reference speed as an output from the location determination system (or another system of the vehicle 102). The location determination system may determine the speed of the vehicle 102 and communicate a signal to the control unit 120 that represents this speed as the reference speed. The control unit 120 compares this received reference speed with the derived speed from the input wheel size to determine the speed error of the vehicle 102. If the speed error exceeds a designated threshold, then the control unit 120 may determine an error state (e.g., that the derived speed is likely inaccurate) and notify the operator via the output device and/or perform one or more corrective actions, as described herein.

Additionally or alternatively, the control unit 120 may track (e.g., log) the speed error over time and use the speed error to calculate an estimated wheel size or input size correction of the wheel. For example, the control unit 120 may integrate the speed error over a period of time (e.g., the time period leading up to and/or following detection of the error state, the time period(s) during which the speed error exceeds the threshold, and the like) to calculate an estimated distance error. This estimated distance error can represent the error in the distance traversed by the vehicle 102 based on the reference speed and the distance traversed by the vehicle 102 based on the derived speed. The estimated distance error may then be used to calculate the input size correction of the input wheel. For example, the estimated distance error may be divided by the number of rotations or revolutions of the reference wheel during the time period over which the speed error is integrated in order to calculate a correction (e.g., the input size correction) to the input wheel size.

The vehicle 102 can include an energy management system (EMS) 128 that determines operational settings of the vehicle 102 to reduce fuel consumed and/or emissions generated by the vehicle 102. The EMS 128 may be embodied in a computer, computer processor, microcontroller, microprocessor, or other logic-based device, that operates based on one or more sets of instructions (e.g., software) stored on a tangible and non-transitory computer readable storage medium (e.g., hard drive, flash drive, ROM, or RAM). The EMS 128 can refer to trip data that represents information about a current or upcoming trip of the vehicle 102, vehicle data that represents characteristics of the vehicle 102, route data that represents information about the route or path on the surface 104 on which the vehicle 102 is traveling or will travel, and/or other data. The trip data can include scheduling information, such as scheduled departure and/or arrival times of the vehicle 102. The vehicle data can include information such as the weight, length, power output, braking capacity, and the like, of the vehicle 102. The route data can include information such as the curvature and/or grade of one or more segments of the route taken by or that will be taken by the vehicle 102. The other data can include additional information that may impact the amount of fuel consumed or emissions generated by the vehicle 102, such as the weather (e.g., high winds), friction or adhesion of the vehicle 102 to the surface 104, and the like. Based on this and/or other data, the EMS 128 may generate a trip plan that designates operational settings, such as power output, throttle settings, brake settings, and the like, for controlling movement of the vehicle 102 and which may be expressed as a function of time and/or distance along a route. By following the trip plan, the vehicle 102 may consume less fuel and/or generate fewer emissions relative to the vehicle 102 traveling according to one or more other plans. In another embodiment, the EMS 128 may receive the trip plan from an off-board (e.g., remote) location, such as a dispatch facility.

The EMS 128 may generate control signals that are communicated to the control unit 120. The control unit 120 may convert these control signals into signals that are usable by the propulsion system 106 (and/or may otherwise use the control signals) to automatically control the tractive and/or braking output of the propulsion system 106. Alternatively, the control signals may be communicated to the output device 126 to allow the presentation of instructions to the operator so that the operator may manually control the propulsion system 106 according to the trip plan.

Figure 3:
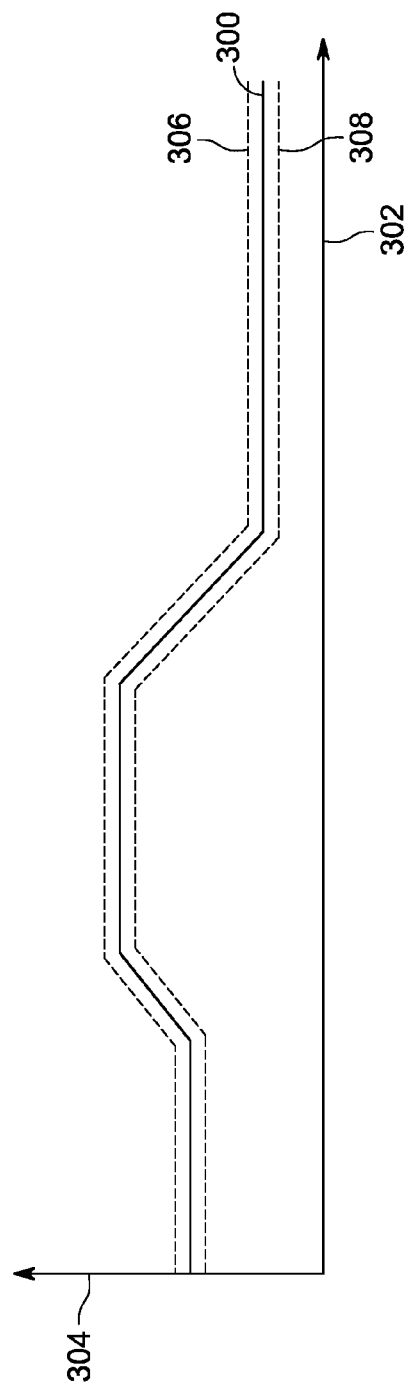
FIG. 3 illustrates one example of a trip plan generated or obtained by an energy management system of the vehicle.

FIG. 3 illustrates one example of a trip plan 300 generated or obtained by the EMS 128 (shown in FIG. 1). The trip plan 300 is shown alongside a horizontal axis 302 representative of time or distance along a route and a vertical axis 304 representative of output of the propulsion system 106 (shown in FIG. 1). The vertical axis 304 may represent speeds of the vehicle 102 (shown in FIG. 1), with the EMS 128, control unit 120, and/or propulsion system 106 determining the throttle settings, brake settings, and/or power output of the propulsion system 106 that is used to cause the vehicle 102 to travel at the speeds designated by the trip plan 300.

The designated speeds of the trip plan 300 may represent the designated actual speeds of the vehicle 102 that reduce fuel consumed and/or emissions generated by the vehicle 102. The EMS 128 and/or operator may operate the vehicle 102 based on a reliance on an incorrect or inaccurate speed of the vehicle 102. For example, the EMS 128 and/or operator may control operations of the vehicle 102 such that the derived speeds match or approximately follow the designated speeds of the trip plan 300. If the derived speeds are incorrect or inaccurate due to an erroneous input size of the wheel 110 (shown in FIG. 1), then the vehicle 102 may be controlled to travel according to a faster trip plan 306 than the trip plan 300 (e.g., when the input size of the wheel 110 is smaller than the actual size and the derived speeds are slower than the actual speeds of the vehicle 102) than the trip plan 300. On the other hand, if the input size of the wheel 110 is larger than the actual size, the derived speeds may be faster than the actual speeds of the vehicle 102 and the vehicle 102 may be controlled to travel according to a slower trip plan 308 than the trip plan 300. If the vehicle 102 is operated to travel at speeds of the faster or slower trip plan 306 or 308, then the vehicle 102 may consume more fuel and/or generate more emissions than traveling according to the trip plan 300.

In one embodiment, the EMS 128 (shown in FIG. 1) and/or the propulsion system 106 (shown in FIG. 1) may modify the control signals that are generated or used to automatically control operations of the vehicle 102 (shown in FIG. 1) and/or that are presented to the operator to control the vehicle 102 based on an identified error in the input size of the wheel 110 (shown in FIG. 1). For example, an error in the input size of the wheel 110 may be identified by the control unit 120, as described above. The EMS 128 and/or propulsion system 106 can modify the control signals used to automatically control the vehicle 102 according to the trip plan 300 and/or that are used to direct the operator to control the vehicle 102 according to the trip plan 300 based on the error in the input size of the wheel 110. A correction to the derived speed can be calculated based on the error in the input size of the wheel 110 and this correction may be used to determine modified control signals based on the trip plan 300. The modified control signals may automatically control the vehicle 102 and/or direct the operator to control the vehicle 102 to operate at speeds that are faster or slower than the designated speeds of the trip plan 300 so that the vehicle 102 actually travels at speeds that are closer to the trip plan. For example, if the error in the input size of the wheel 110 causes the vehicle 102 to actually travel at faster speeds than the designated speeds of the trip plan 300, then the EMS 128 and/or propulsion system 106 can generate the modified control signals that decrease the speed of the vehicle 102 to more closely match the speeds of the trip plan 300. On the other hand, if the error in the input size of the wheel 110 causes the vehicle 102 to actually travel at slower speeds than the designated speeds of the trip plan 300, then the EMS 128 and/or propulsion system 106 can generate the modified control signals that increase the speed of the vehicle 102 to more closely match the speeds of the trip plan 300.

In another embodiment, the EMS 128 may modify the trip plan 300 based on the error in the input size of the wheel 110. For example, if the error in the input size of the wheel 110 causes the vehicle 102 to actually travel at faster speeds than the designated speeds of the trip plan 300, then the EMS 128 may modify (e.g., re-plan) the trip plan 300 to include slower speeds. On the other hand, if the error in the input size of the wheel 110 causes the vehicle 102 to actually travel at slower speeds than the designated speeds of the trip plan 300, then the EMS 128 can modify the trip plan 300 to include faster speeds. The modified trip plan may then result in the vehicle 102 being controlled to travel at actual speeds that more closely match the trip plan 300.

Returning to the discussion of the system 100, an adhesion control system 130 is disposed onboard the vehicle 102 in the illustrated embodiment. The adhesion control system 130 includes or is connected with an applicator device 132 that delivers adhesion-varying material to the surface 104 on which the vehicle 102 moves. The adhesion-varying material is applied to change an amount of adhesion of the wheels 110 to the surface 104 and/or to change a friction coefficient between the wheels 110 and the surface 104. Examples of adhesion-varying material include sand, air (e.g., compressed and/or heated air), and the like. The adhesion control system 130 may be embodied in a computer, computer processor, microcontroller, microprocessor, or other logic-based device, that operates based on one or more sets of instructions (e.g., software) stored on a tangible and non-transitory computer readable storage medium (e.g., hard drive, flash drive, ROM, or RAM). The adhesion control system 130 shown in FIG. 1 can also represent a container or chamber that stores the adhesion-varying material. The applicator device 132 is directed by the adhesion control system 130 when to apply the adhesion-varying material and/or how much adhesion-varying material to deliver to the surface 104. The applicator device 132 can include a spout, spigot, or other device capable of controlling when the adhesion-varying material is applied and/or how much adhesion-varying material is applied. While only one applicator device 132 is shown in FIG. 1, alternatively, plural applicator devices 132 may be provided. For example, each wheel 110 or each of several subsets of the wheels 110 may be associated with a separate applicator device 132 that delivers adhesion-varying material to that wheel 110 or wheels 110 in the subset.

The adhesion control system 130 may determine when to apply the adhesion-varying material and/or the amount of adhesion-varying material to be applied to the surface 104 based on relative sizes of the wheels 110. For example, the adhesion control system 130 may direct the applicator device 132 to apply more adhesion-varying material to the surface 104 in a location ahead of a wheel 110 that is a smaller size than the reference wheel 110 or to apply less adhesion-varying material for a wheel 110 that is larger than the reference wheel 110. The sizes of the wheels 110 may be measured and input into the memory 118 and/or one or more default sizes for the wheels 110 may be stored in the memory 118. The adhesion control system 130 can refer to the memory 118 to determine how much adhesion-varying material to apply for one or more of the wheels 110 based on relative sizes of the wheels 110. In one embodiment, the adhesion control system 130 bases how much adhesion-varying material is applied for a wheel 110 of interest based on ratios (or other relations) between the diameter of the wheel of interest and the reference wheel 110.

If the control unit 120 determines that the input size of the reference wheel 110 is incorrect or inaccurate, then the control unit 120 can correct the input size of the reference wheel 110, as described above. The corrected input size may be stored in the memory 118 and/or communicated to the adhesion control system 130. The adhesion control system 130 can then control how much adhesion-varying material is applied for one or more wheels 110 based on relative sizes between the one or more wheels 110 and the corrected input size of the reference wheel 110.

In another embodiment, the control unit 120 may identify errors in the input size of the reference wheel 110 based on differences between a location of the vehicle 102 that is calculated from the derived speed and a location of the vehicle 102 that is determined by the location determination system 124. The control unit 120 can calculate a derived location of the vehicle 102 based on the derived speeds of the vehicle 102 from a sensed location and an elapsed time since the vehicle 102 passed or left the sensed location. For example, the derived speeds of the vehicle 102 can be tracked or monitored over an elapsed time period to generate a speed curve that represents changes in the derived speeds during the elapsed time. This curve may then be integrated over the elapsed time to determine a distance from the sensed location. The distance from the sensed location can be used to identify the derived location of the vehicle 102.

The location determination system 124 also can determine a location of the vehicle 102 at the derived location. The control unit 120 can compare the derived location with the location identified by the location determination system 124. If a difference between these locations exceeds a designated, non-zero threshold, then the control unit 120 may identify an error in the input size of the wheel 110. In one embodiment, the control unit 120 can use this difference to calculate a correction to the input size of the wheel 110, such as by calculating the difference between the input size and the actual size of the wheel 110 that resulted in, or corresponds to, the difference between the locations to be calculated.

In another embodiment, the control unit 120 may use one or more algorithms that determine errors in locations of the vehicle 102 that are based on the derived speeds, such as an algorithm that uses a Kalman filter. The control unit 120 can use the Kalman filter to identify a location error in a location of the vehicle 102 that is output or generated by the Kalman filter. The size of this location error may be used to identify an incorrect or inaccurate input size of the wheel 110.

Figure 4:
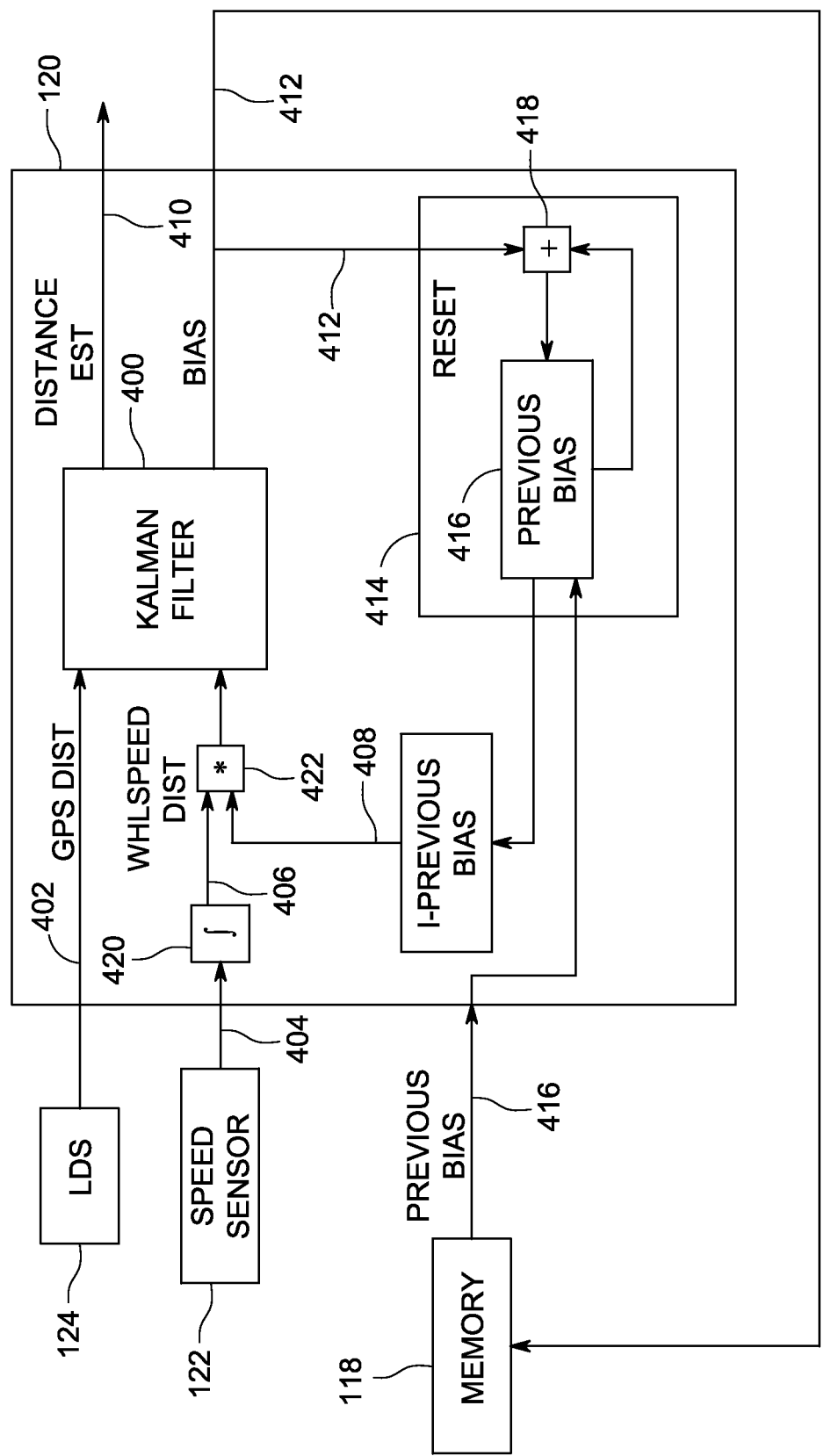
FIG. 4 is a block diagram of a control unit shown in FIG. 1 in accordance with one embodiment.

FIG. 4 is a block diagram of the control unit 120 in accordance with one embodiment. The control unit 120 is illustrated in FIG. 4 to show the input data is received by an algorithm 400 ("Kalman Filter" in FIG. 4) of the control unit 120 and the output data from the algorithm. In the illustrated embodiment, the algorithm 400 uses a Kalman filter to receive the input data and to generate the output data. The input data includes a sensed location 402 ("GPS Dist." in FIG. 4) of the vehicle 102 (shown in FIG. 1) that is determined by the location determination system 124. Alternatively, the sensed location 402 may represent a distance along a path traveled by the vehicle 102 from a reference location and as identified by the location determination system 124. The input data also includes a rotation speed 402 of the axle 108 (shown in FIG. 1) and/or wheel 110 (shown in FIG. 1).

The rotation speed 404 is integrated over time (e.g., the time period that has elapsed since the vehicle 102 left or passed the baseline location) by an integrator algorithm 420 in order to calculate a derived distance 406 ("WhlSpeed Dist." in FIG. 4). The derived distance 406 can represent the distance that the vehicle 102 (shown in FIG. 1) has traveled along a route or path from the reference location. Alternatively, the derived distance 406 may be expressed as a location that is separated from the reference location by the derived distance 406. In one embodiment, a bias correction 408 (described below) is combined with the derived distance 406 by a summing algorithm 422 before the derived distance 406 is input into the algorithm 400.

The algorithm 400 receives the input data (e.g., the sensed location 402 and the derived distance 406) and applies a Kalman filter to the input data to calculate an estimated location 410 ("Distance Est." in FIG. 4). The estimated location 410 may be expressed as a geographic location or a distance along a route traveled by the vehicle 102 from the reference location. The algorithm 400 also outputs a location error 412 ("Bias" in FIG. 4) that represents an error or degree of uncertainty in the estimated location 410. This location error 412 also may be referred to as a bias that is output from the algorithm 400. The location error 412 may be communicated the memory 118 for storage and/or later retrieval. The location error 412 that is stored in the memory 118 may be referred to as a previous bias 416.

The bias 412 also may be communicated to a reset algorithm 414 of the control unit 120. The reset algorithm 414 monitors the location error 412 and/or changes in the location error 412 over time. In one embodiment, the reset algorithm 414 combines (e.g., sums with a summer 418) the location error 412 received from the algorithm 400 with the previous bias 416 that is retrieved from the memory 118 and is associated with a previously estimated location 410. In one embodiment, if the location error 412 from the algorithm 400 exceeds a designated threshold, then the reset algorithm 414 may reset the location error 412, such as by setting the previous bias 416 in the memory 118 to a value of zero and/or setting the value of the location error 412 to the value of the previous bias 416. The reset algorithm 414 may set the value of the location error 412 to be the value of the previous bias 416 to reduce drift in the calculation of the estimated location 410 from the algorithm 400.

The reset algorithm 414 outputs the bias correction 408 to the algorithm 400 (or the summing algorithm 422. In the illustrated embodiment, the bias correction 408 has a value of one minus the previous bias 416. Alternatively, if the location error 412 is not set to be equal to the previous bias 416, the bias correction 408 may have a value of one minus the location error 412. In another embodiment, the bias correction 408 may have another value.

The control unit 120 may identify an error in the input size of the wheel 110 (shown in FIG. 1) by monitoring the bias 412 that is output from the algorithm 400. For example, the control unit 120 (or the algorithm 400 of the control unit 120) may track the location error 412 and identify an error in the input size of the wheel 110 when the location error 412 exceeds a designated threshold. This identification of error can be communicated from the control unit 120 to the output device 126 (shown in FIG. 1) and/or memory 118, as described above.

In one embodiment, the algorithm 400 may receive the input data and/or generate the output data when the operational conditions of the vehicle 102 are within a range of operational enablement conditions. For example, the control unit 120 can limit when the input data is received and/or when the estimated location 410 and/or location error 412 are generated by the algorithm 400 to only when one or more operational conditions of the vehicle 102 are met. For example, the control unit 120 may activate the algorithm 400 when a measurement error of the location determination system 124 is below a designated threshold, a dilution of precision (DOP) of a GPS system (that is part of the location determination system 124) is no greater than a threshold, the vehicle 102 is stationary, or the vehicle 102 has a derived speed within a designated range of speeds, similar to as described above.

Figure 5:
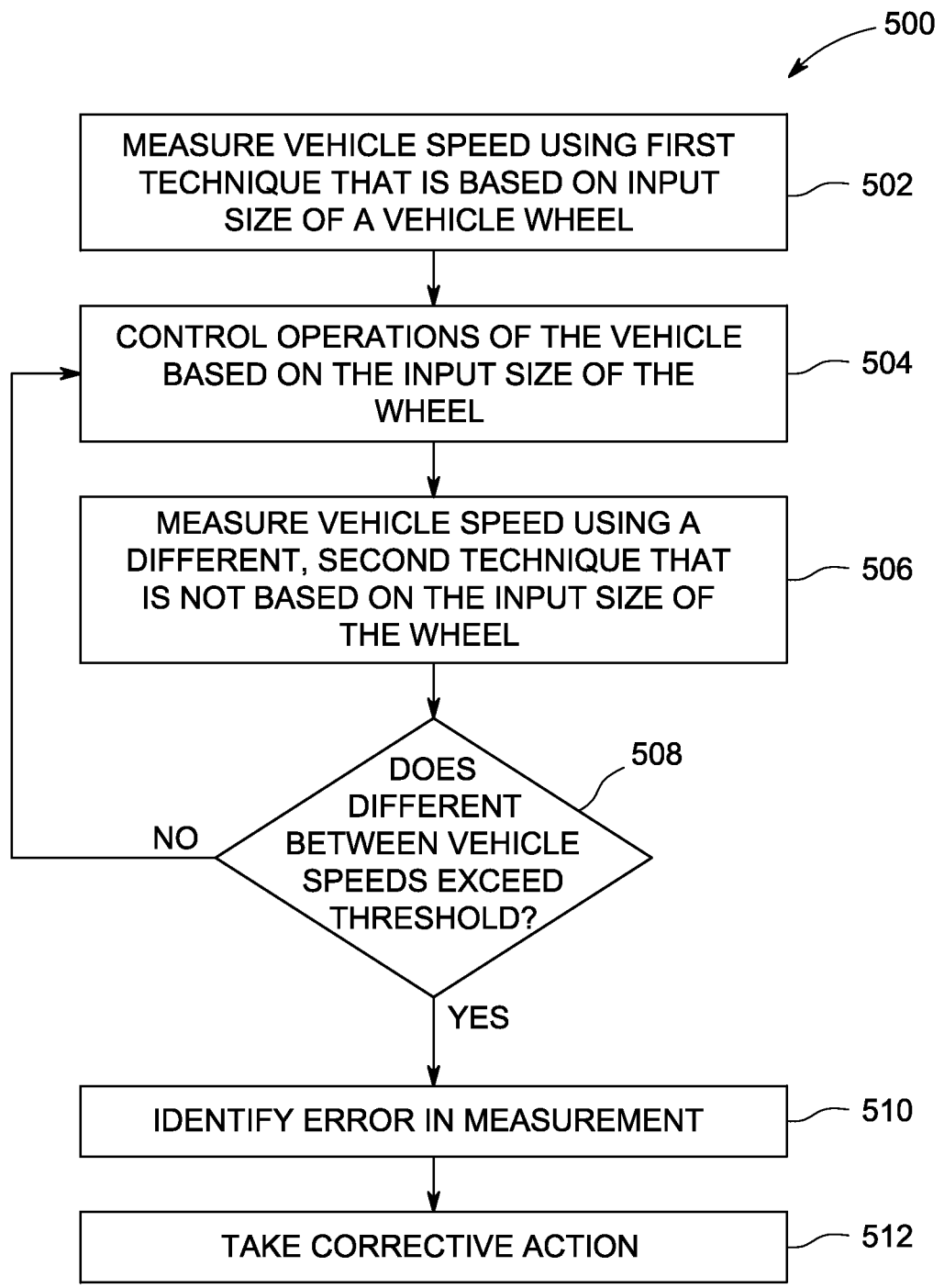
FIG. 5 illustrates a flowchart of one embodiment of a method for identifying errors in derived speeds of a vehicle and/or for modifying one or more measurements upon which the derived speeds are based.

FIG. 5 illustrates a flowchart of one embodiment of a method 500 for identifying errors in derived speeds of a vehicle and/or for modifying one or more measurements upon which the derived speeds are based. The method 500 may be used in conjunction with one or more embodiments of the system 100 (shown in FIG. 1) described above.

At 502, a speed of a vehicle (e.g., a vehicle speed) is measured using a first technique that is based on a measurement, such as a measurement of a size (e.g., input size) of a wheel (e.g., a vehicle wheel). For example, a derived speed may be calculated for the vehicle 102 (shown in FIG. 1) by obtaining an input size of a reference wheel 110 (shown in FIG. 1) and multiplying a circumference of the wheel 110 (that is based on the input size) by the rotational speed at which the wheel 110 is rotated. Alternatively, another technique may be used to obtain a derived speed of the vehicle.

At 504, operations of the vehicle are controlled based on the derived speed. For example, an operator may control the throttle and/or brakes of the vehicle 102 (shown in FIG. 1) based on the derived speed that is calculated and/or presented to the operator. Alternatively, the vehicle 102 may be automatically controlled to follow a trip plan 300 (shown in FIG. 3) that designates operations of the vehicle 102 that are based on the derived speed of the vehicle 102.

At 506, the speed of the vehicle is measured using a different, second technique that is not based on the measurement used to determine the speed of the vehicle at 502. For example, a reference speed of the vehicle 102 (shown in FIG. 1) may be determined using the location determination system 124 (shown in FIG. 1). Alternatively, another technique may be used, such as by using a radar sensor, a light sensor, and the like, that measures round trip times of emitted radar and/or light to measure the speed of the vehicle 102. In another embodiment, another technique may be used that is not calculated from the input size of the wheel 110 (shown in FIG. 1).

At 508, a determination is made as to whether a difference between the vehicle speed determined using the first technique and the vehicle speed determined using the second technique exceeds a designated threshold. For example, a difference between the derived speed of the vehicle 102 (shown in FIG. 1) and the reference speed of the vehicle 102 may be calculated. If the difference is significant (e.g., exceeds a threshold), then the measurement upon which the derived speed is based (e.g., the input size of the wheel 110) may be erroneous. As a result, flow of the method 500 flows to 510. If the difference is not significant (e.g., does not exceed the threshold), then the measurement may not be erroneous, or the error in the measurement may be relatively small. As a result, flow of the method 500 returns to 504.

At 510, an error in the measurement upon which the derived speed is based is identified. For example, the measurement that is used to determine the vehicle speed using the first technique (e.g., at 502) is identified as being erroneous. The method 500 may additionally include correcting the error in the measurement, such as by correcting the input size of the wheel 110 (shown in FIG. 1) so that further derived speeds are based on a corrected (e.g., more accurate) input size of the wheel 110.

At 512, one or more corrective actions may be taken in response to the identified error in the input size of the wheel. The corrective actions may be automatically and/or manually performed. As described herein, various actions can be taken by the control unit of the vehicle and/or the operator in response to identification of an error in an input size of a wheel of the vehicle. For example, the control unit and/or operator can autonomously or manually, respectively, log an informative incident to indicate that the incorrect wheel size has been entered into a trip log when the error in the input size of the wheel is identified. Alternatively or additionally, the control unit and/or operator may notify repair personnel, such as field engineers, of the erroneous input wheel size. For example, upon detection of the erroneous wheel size, the control unit and/or operator can transmit a message to a repair facility or location to which the vehicle is traveling. The repair facility or location can receive the message and prepare to take corrective action for when the vehicle arrives, such as by re-measuring the wheel size, replacing the wheel, or taking other action. Also as described above, an energy management system can modify a trip plan when the error in the wheel size is identified. For example, the energy management system can stop automatic control of the vehicle according to the trip plan and/or stop providing instructions to the operator to control the vehicle according to the trip plan (e.g., when operating in a "coaching mode") when the identified error in the wheel size exceeds a designated threshold. In one embodiment, the energy management system may suspend the automatic control and/or coaching mode when the identified error in the wheel size may cause the vehicle to actually travel faster than reported or measured based on the wheel size but permit continued use of the automatic control and/or coaching mode when the identified error in the wheel size may cause the vehicle to actually travel slower than reported or measured based on the wheel size.

In another embodiment, a method (e.g., a method for identifying an error in a speed of a vehicle) is provided. The method includes receiving an input size of a wheel of a vehicle, determining a derived speed of the vehicle that is based on the input size of the wheel, determining a reference speed of the vehicle as the vehicle moves, comparing the derived speed with the reference speed of the vehicle, and identifying an error in the input size of the wheel based on a difference between the derived speed and the reference speed.

In another aspect, receiving the input size of the wheel includes receiving a manual measurement of the input size of the wheel from an operator.

In another aspect, receiving the input size of the wheel includes obtaining a default wheel measurement as the input size of the wheel.

In another aspect, determining the derived speed of the vehicle includes monitoring a rotation speed of the wheel and calculating the derived speed based on the input size and the rotation speed of the wheel.

In another aspect, comparing the derived speed with the reference speed includes calculating a speed error as the difference between the derived speed and the reference speed and identifying the error occurs when the speed error exceeds a designated threshold.

In another aspect, the method also includes calculating an input size correction to the input size of the wheel based on an integration of the speed error over a period of time.

In another aspect, determining the reference speed includes determining plural locations of the vehicle at different measurement times and calculating the reference speed based on one or more distances between the plural locations and one or more time periods between the measurement times.

In another aspect, determining the reference speed includes identifying a first location of the vehicle that is based on a rotation speed of the wheel and a second location of the vehicle that is determined by a location determination system. The error in the input size of the wheel can be identified when a deviation between the first location and the second location exceeds a threshold.

In another aspect, determining the reference speed of the vehicle is performed when one or more operational enablement conditions of the vehicle occur. The one or more operational enablement conditions include at least one of a dilution of precision (DOP) of a global positioning system (GPS) of the vehicle exceeding a non-zero designated threshold, the vehicle being in a non-powered state, or the reference speed of the vehicle being between a non-zero first speed threshold and an upper second speed threshold.

In another aspect, identifying the error in the input size of the wheel includes monitoring a rotational speed of the wheel, determining a sensed location of the vehicle from a location determination system, and inputting the rotational speed and the sensed location into a Kalman filter to receive a derived location of the vehicle and a location error, further wherein the error in the input size of the wheel is identified when the location error exceeds a designated threshold.

In another aspect, inputting the rotational speed and the sensed location into the Kalman filter includes inputting the location error into the Kalman filter as an input bias.

In another aspect, the method also includes displaying a vehicle speed to an operator of the vehicle that is based on the reference speed being corrected by the error.

In another aspect, the vehicle is controlled according to a trip plan that designates a speed profile of the vehicle in order to reduce at least one of fuel consumed or emissions generated by the vehicle. The method can also include modifying the speed profile of the trip plan based on the error in the input size of the wheel.

In another aspect, the vehicle is controlled according to a trip plan that designates a speed profile of the vehicle in order to reduce at least one of fuel consumed or emissions generated by the vehicle. The method can also include automatically controlling operations of the vehicle such that the derived speed of the vehicle follows the speed profile of the trip plan and automatically changing the input size of the wheel in order to correct the derived speed of the vehicle responsive to the error in the input size being identified. The vehicle can continue to be automatically controlled to follow the speed profile of the trip plan with the derived speed that is based on the input size of the wheel that is corrected.

In another aspect, the vehicle includes plural wheels that include the input wheel, and further comprising applying an adhesion-varying material to a surface on which the vehicle moves to vary adhesion between the wheels and the surface. At least one of an amount or type of the adhesion-varying material that is applied is based on comparisons between sizes of one or more of the wheels and a corrected size of the input wheel. The corrected size is based on the input size and the error in the input size of the wheel.

In another aspect, the method also includes notifying an operator of the vehicle of the error in the input size of the wheel responsive to identifying the error.

In another aspect, the method also includes automatically correcting the input size of the wheel responsive to identifying the error in the wheel size.

In another embodiment, a system (e.g., for identifying an error in a speed of a vehicle) includes an input device and a control unit. The input device is configured to be disposed onboard a vehicle for receiving an input size of a wheel of the vehicle. The control unit is configured to be disposed onboard the vehicle for determining (i) a derived speed of the vehicle that is based on the input size of the wheel and (ii) a reference speed of the vehicle as the vehicle moves. The control unit also configured to compare the derived speed with the reference speed of the vehicle in order to identify an error in the input size of the wheel. The error is based on a difference between the derived speed and the reference speed.

In another aspect, the input device is configured to receive a manual measurement of the input size of the wheel from an operator.

In another aspect, the input device is configured to obtain a default wheel measurement from a memory as the input size of the wheel.

In another aspect, the system also includes a speed sensor that is configured to be disposed onboard the vehicle to monitor a rotation speed of the wheel. The control unit is configured to calculate the derived speed based on the input size and the rotation speed of the wheel that is monitored by the speed sensor.

In another aspect, the control unit is configured to calculate a speed error as the difference between the derived speed and the reference speed. The control unit also is configured to identify the error in the input size of the wheel when the speed error exceeds a designated threshold.

In another aspect, the control unit is configured to determine an input size correction to the input size of the wheel by integrating the speed error over a period of time.

In another aspect, the system also includes a location determination system that is configured to be disposed onboard the vehicle for determining plural locations of the vehicle at different measurement times. At least one of the location determination system or the control unit also is configured to calculate the reference speed based on one or more distances between the plural locations and one or more time periods between the measurement times.

In another aspect, the control unit is configured to identify a first location of the vehicle that is based on a rotation speed of the wheel and a second location of the vehicle that is determined by a location determination system. The control unit also is configured to determine the reference speed based on the first location and the second location. The error in the input size of the wheel is identified by the control unit when a deviation between the first location and the second location exceeds a threshold.

In another aspect, the control unit is configured to monitor operations of the vehicle and to determine the reference speed of the vehicle when one or more operational enablement conditions of the vehicle occur. The one or more operational enablement conditions include at least one of a dilution of precision (DOP) of a global positioning system (GPS) of the vehicle exceeding a non-zero designated threshold, the vehicle being in a non-powered state, or the reference speed of the vehicle being between a non-zero first speed threshold and an upper second speed threshold.

In another aspect, the system also includes a speed sensor that configured to be disposed onboard the vehicle for monitoring a rotational speed of the wheel and a location determination system that is configured to be disposed onboard the vehicle for determining a sensed location of the vehicle. The control unit is configured to input the rotational speed and the sensed location into a Kalman filter to receive a derived location of the vehicle and a location error. The error in the input size of the wheel is identified by the control unit when the location error exceeds a designated threshold.

In another aspect, the control unit is configured to input the location error into the Kalman filter as an input bias.

In another aspect, the control unit is configured to modify the reference speed to a vehicle speed that is based on the error that is identified. The system may also include an output device configured to be disposed onboard the vehicle for presenting the vehicle speed to an operator of the vehicle.

In another aspect, the control unit is configured to control operations of the vehicle according to a trip plan that designates a speed profile of the vehicle in order to reduce at least one of fuel consumed or emissions generated by the vehicle. The control unit is configured to modify the speed profile of the trip plan based on the error in the input size of the wheel.

In another aspect, the vehicle includes plural wheels that include the input wheel and the control unit is configured to determine at least one of an amount or type of an adhesion-varying material that is applied to a surface upon which the vehicle moves based on comparisons between sizes of one or more of the wheels and a corrected size of the input wheel. The corrected size is based on the input size and the error in the input size of the wheel.

In another embodiment, a method (e.g., for correcting a speed of a vehicle) is provided. The method includes determining a first speed of a vehicle that is based on an input size of a wheel of the vehicle. One or more controls of the vehicle are based on the input size of the wheel. The method also includes determining a second speed of the vehicle that is not based on the input size of the wheel of the vehicle, identifying a difference between the first speed and the second speed, deriving an error in the input size of the wheel based on the difference, and modifying the input size of the wheel based on the error.

In another embodiment, a method comprises receiving an input size of a wheel of a vehicle, determining a derived speed of the vehicle that is based on the input size of the wheel, determining a reference speed of the vehicle as the vehicle moves, comparing the derived speed with the reference speed of the vehicle, and identifying an error in the input size of the wheel based on a difference between the derived speed and the reference speed. The aforementioned steps are all performed on-board the vehicle. In another embodiment, alternatively or additionally to performing all the steps on-board the vehicle, the method further comprises communicating information of the error from on-board the vehicle to an off-board location, such as a central dispatch office. Information of the error may include the error, the derived speed corrected by the error, etc. The information of the error may be communicated responsive to the error being identified, and could be used by the off-board location, for example, for updating a movement plan that coordinates and/or tracks movement of plural vehicles, including the vehicle from which the information of the error was communicated, in a transportation network. In another embodiment, the vehicle is a first vehicle of a vehicle consist (a group of vehicles that are mechanically linked to travel together along a route, for example, a train or other rail vehicle consist), and the method further comprises, additionally or alternatively, communicating information of the error from the first vehicle to one or more other vehicles in the vehicle consist. This may be done, for example, in cases where the error is determined at the first vehicle but is relevant to operations of a second or other vehicles in the consist, such as when the second or another vehicle in the consist is designated for controlling the entire consist according to a trip plan, and/or for distributed power operations (one powered unit of a vehicle consist automatically controlling the tractive effort—braking and/or throttle—of other, remote powered units in the consist), and/or the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
receiving, by one or more computer processors, an input size of a wheel of a rail vehicle that includes plural wheels;
determining, by the one or more computer processors, a derived vehicle speed of the rail vehicle that is based on the input size of the wheel;
determining, by the one or more computer processors, a reference vehicle speed of the rail vehicle as the rail vehicle moves;
comparing, by the one or more computer processors, the derived vehicle speed with the reference vehicle speed;
identifying, by the one or more computer processors, an error in the input size of the wheel based on a difference between the derived vehicle speed and the reference vehicle speed, wherein movement of the rail vehicle along a designated route is controlled by a trip plan, the trip plan designating operational settings of the rail vehicle as a function of at least one of time or distance along the designated route;
responsive to identifying the error in the input size of the wheel, modifying, by the one or more computer processors, at least one of the trip plan or control signals that are based on the trip plan to modify the movement of the rail vehicle; and
directing, by the one or more computer processors, application of an adhesion-varying material to a surface on which the rail vehicle moves to vary adhesion between the wheels and the surface,
wherein at least one of an amount or type of the adhesion-varying material that is applied is based on comparisons between sizes of one or more of the wheels and a corrected size of the input wheel, the corrected size based on the input size and the error in the input size of the wheel,
wherein the amount of the adhesion-varying material that is applied ahead of at least one of the wheels along the designated route is increased when the at least one of the wheels is smaller than the corrected size of the input wheel relative to an amount of the adhesion-varying material that is applied when the at least one of the wheels is larger than the input wheel, and the amount of the adhesion-varying material that is applied ahead of the at least one of the wheels along the designated route is decreased when the at least one of the wheels is larger than the corrected size of the input wheel relative to an amount of the adhesion-varying material that is applied when the at least one of the wheels is smaller than the input wheel.

2. The method of claim 1, wherein receiving the input size of the wheel includes receiving a manual measurement of the input size of the wheel from an operator.

3. The method of claim 1, wherein determining the derived vehicle speed includes monitoring a rotation speed of the wheel and calculating the derived vehicle speed based on the input size and the rotation speed of the wheel.

4. The method of claim 1, wherein comparing the derived vehicle speed with the reference vehicle speed includes calculating a speed error as the difference between the derived vehicle speed and the reference vehicle speed and identifying the error occurs responsive to the speed error exceeding a designated threshold.

5. The method of claim 1, wherein determining the reference vehicle speed includes determining plural locations of the rail vehicle at different measurement times and calculating the reference vehicle speed based on one or more distances between the plural locations and one or more time periods between the measurement times.

6. The method of claim 1, wherein determining the reference vehicle speed includes identifying a first location of the rail vehicle that is based on a rotation speed of the wheel and a second location of the rail vehicle that is determined by a location determination system that includes a receiver and circuitry, and the error in the input size of the wheel is identified responsive to a deviation between the first location and the second location exceeding a threshold.

7. The method of claim 1, wherein determining the reference vehicle speed is performed responsive to one or more operational enablement conditions of the rail vehicle occurring, the one or more operational enablement conditions including at least one of a dilution of precision (DOP) of a global positioning system (GPS) of the rail vehicle exceeding a non-zero designated threshold or the reference vehicle speed being between a non-zero first speed threshold and an upper second speed threshold.

8. The method of claim 1, further comprising displaying a vehicle speed to an operator of the rail vehicle that is based on the reference vehicle speed being corrected by the error.

9. The method of claim 1, wherein the trip plan designates a speed profile of the rail vehicle,
wherein modifying at least one of the trip plan or the control signals that are based on the trip plan includes modifying the speed profile of the trip plan based on the error in the input size of the wheel.

10. The method of claim 1, wherein the trip plan designates a speed profile of the rail vehicle, and further comprising:
automatically controlling operations of the rail vehicle such that the derived speed of the rail vehicle follows the speed profile of the trip plan; and
automatically changing the input size of the wheel in order to correct the derived speed of the rail vehicle responsive to the error in the input size being identified, wherein the rail vehicle continues to be automatically controlled to follow the speed profile of the trip plan with the derived speed that is based on the input size of the wheel that is corrected.

11. The method of claim 1, further comprising notifying an operator of the rail vehicle of the error in the input size of the wheel responsive to identifying the error.

12. The method of claim 1, further comprising automatically correcting the input size of the wheel responsive to identifying the error in the wheel size.

13. A system comprising:
an input device configured to be disposed onboard a vehicle for receiving an input size of a wheel of the rail vehicle that includes plural wheels; and one or more computer processors configured to be disposed onboard the rail vehicle for determining a derived vehicle speed of the rail vehicle that is based on the input size of the wheel, and also for determining a reference vehicle speed of the rail vehicle as the rail vehicle moves, the one or more computer processors also configured to compare the derived vehicle speed with the reference vehicle speed and identify an error in the input size of the wheel, wherein the error is based on a difference between the derived vehicle speed and the reference vehicle speed;

wherein the one or more computer processors are configured to control movement of the rail vehicle along a designated route in accordance with a trip plan, the trip plan designating operational settings of the rail vehicle as a function of at least one of time or distance along the designated route, wherein the one or more computer processors are configured to, in response to identifying the error in the input size of the wheel, modify at least one of the trip plan or control signals that are based on the trip plan to modify the movement of the rail vehicle, and wherein the one or more computer processors are configured to determine at least one of an amount or type of an adhesion-varying material that is applied to a surface upon which the rail vehicle moves based on comparisons between sizes of one or more of the wheels and a corrected size of the input wheel, the corrected size based on the input size and the error in the input size of the wheel, wherein the one or more computer processors are configured to determine the amount of the adhesion-varying material that is applied ahead of at least one of the wheels along the designated route as a larger amount when the at least one of the wheels is smaller than the corrected size of the input wheel relative to an amount of the adhesion-varying material that is applied when the at least one of the wheels is larger than the input wheel, and the one or more computer processors are configured to determine the amount of the adhesion-varying material that is applied ahead of the at least one of the wheels along the designated route to be a smaller amount when the at least one of the wheels is larger than the corrected size of the input wheel relative to an amount of the adhesion-varying material that is applied when the at least one of the wheels is smaller than the input wheel.

14. The system of claim 13, wherein the input device is configured to receive a manual measurement of the input size of the wheel from an operator.

15. The system of claim 13, further comprising a speed sensor configured to be disposed onboard the rail vehicle to monitor a rotation speed of the wheel, wherein the one or more computer processors are configured to calculate the derived vehicle speed based on the input size and the rotation speed of the wheel that is monitored by the speed sensor.

16. The system of claim 13, wherein the one or more computer processors are configured to calculate a speed error as the difference between the derived vehicle speed and the reference vehicle speed, and the one or more computer processors are configured to identify the error in the input size of the wheel responsive to the speed error exceeding a designated threshold.

17. The system of claim 13, further comprising a location determination system that includes a receiver and circuitry configured to be disposed onboard the rail vehicle for determining plural locations of the rail vehicle at different measurement times, wherein at least one of the location determination system or the one or more computer processors also is configured to calculate the reference vehicle speed based on one or more distances between the plural locations and one or more time periods between the measurement times.

18. The system of claim 13, wherein the one or more computer processors are configured to identify a first location of the rail vehicle that is based on a rotation speed of the wheel and a second location of the rail vehicle that is determined by a location determination system that includes a receiver and circuitry, the one or more computer processors also configured to determine the reference vehicle speed based on the first location and the second location, wherein the error in the input size of the wheel is identified by the one or more computer processors responsive to a deviation between the first location and the second location exceeding a threshold.

19. The system of claim 13, wherein the one or more computer processors are configured to modify the reference vehicle speed to a vehicle speed that is based on the error that is identified, and further comprising an output device configured to be disposed onboard the vehicle for presenting the vehicle speed to an operator of the rail vehicle.

20. The system of claim 13, wherein the trip plan designates a speed profile of the rail vehicle, and the one or more computer processors are configured to modify the speed profile of the trip plan based on the error in the input size of the wheel.

\* \* \* \* \*